Aug. 21, 1951  V. K. ELORANTA  2,565,362
VARIABLE DENSITY GOGGLE

Filed Dec. 20, 1948  2 Sheets-Sheet 1

INVENTOR
Vaito K. Eloranta
BY Donald L. Brown
Attorney

Patented Aug. 21, 1951

2,565,362

UNITED STATES PATENT OFFICE 2,565,362

VARIABLE DENSITY GOGGLE

Vaito K. Eloranta, Boston, Mass., assignor to Polaroid Corporation, Cambridge, Mass., a corporation of Delaware Application December 20, 1948, Serial No. 66,358

7 Claims. (Cl. 88—41)

This invention relates to a new and improved variable density sunglass or viewing device and more specifically to a variable density device of the character described which is light in weight, cheap and easy to manufacture, durable, and which is formed essentially of elements which may be stamped from sheet stock.

An object of the invention is to provide a sunglass or viewing device which comprises a plurality of light-polarizing elements positioned before each eye of the wearer and which is provided with cheap, easily assembled, light-weight means for rotating one of each of said plurality of elements simultaneously whereby the intensity of light transmitted to the eyes of a wearer of the device may be altered at will.

Other objects of the invention are to provide such a device in which the moving parts are protected from moisture and from dust; in which the eye lenses, the frame for mounting the lenses, and the elements employed to effect relative rotation of lens elements are all lightweight, readily assembled and relatively cheap to manufacture; and in which an element may be readily removed and replaced if its operation becomes impaired.

Other objects of the invention will in part be obvious and will in part appear hereinafter.

The invention accordingly comprises the product possessing the features, properties and the relation of components which are exemplified in the following detailed disclosure, and the scope of the application of which will be indicated in the claims.

For a fuller understanding of the nature and objects of the invention, reference should be had to the following detailed description taken in connection with the accompanying drawings wherein.

Heretofore variable density goggles and sunglasses have been uniformly heavy, unwieldy, costly to manufacture, and difficult to keep clean. This invention provides a variable density goggle or sunglass which is light in weight, easy to clean, relatively cheap to manufacture, and easy to assemble.

Figure 1:
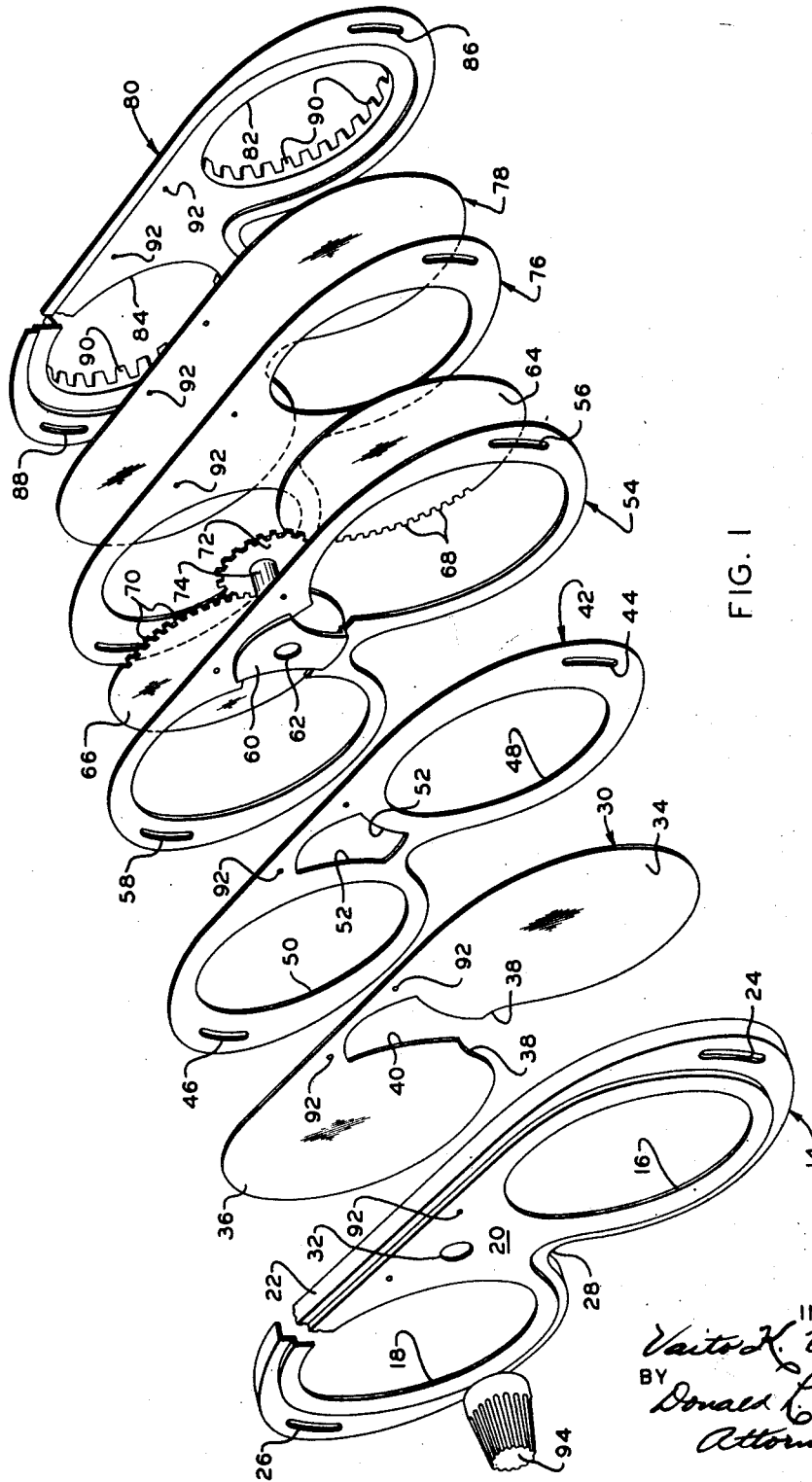
Figure 1 is an exploded view in perspective of the lenses, the lens-mounting means and associated elements, parts being shown in dotted line and broken away for clarity.
Figure 2:
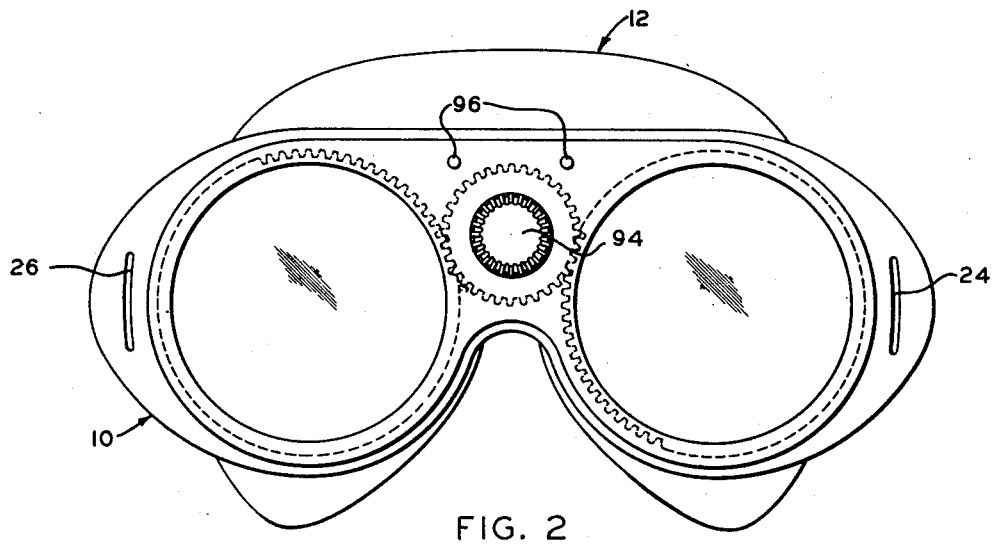
Fig. 2 is a front elevation of a preferred embodiment of the invention, certain hidden parts being shown in dotted line for clarity.
Figure 3:
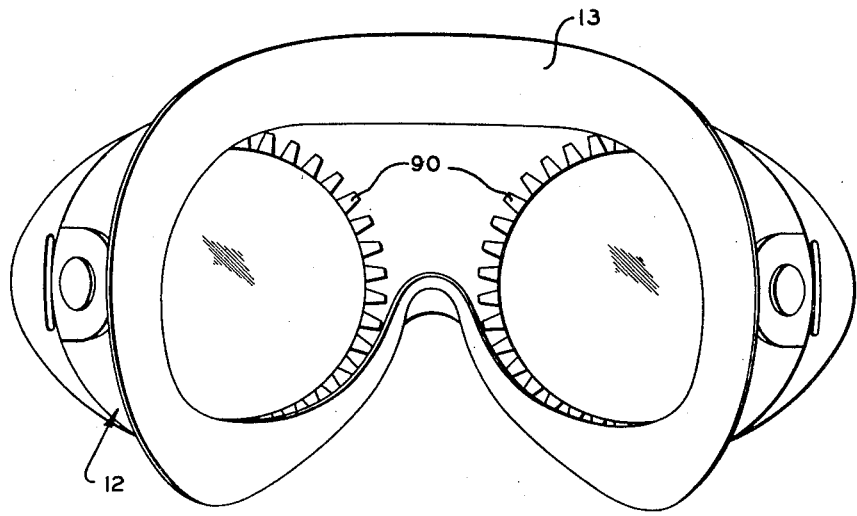
Fig. 3 is a rear elevation of the device shown in Fig. 2.

A preferred embodiment of the invention is shown in the drawings. The goggle comprises a relatively thin, flat, light-weight lens and lens mounting assembly 10, the elements of which are shown in perspective and in spaced relation in Fig. 1, and a resilient, opaque, face-engaging shield 12 which is affixed to the rear housing of the lens and lens mounting assembly, and which is provided with an outwardly flaring, face-engaging flange 13 adapted to make contact with, and conform to the curvature of, the face of a wearer of the goggle. The opaque face-engaging shield may be formed of any suitable material such, for example, as rubber. Similar shields are well known in the art and have been used heretofore in connection with related ophthalmic devices. Accordingly, it is to be understood that the face-engaging shield illustrated in Figs. 2 and 3 is not to be deemed as contributing essentially to the features of the invention except as the contrary may hereafter be expressly asserted.

The lens and lens mounting assembly 10 comprises a front housing 14 which may be formed of thin sheet metal, for example aluminum of a thickness of approximately 0.016 inch. The front housing 14 may be stamped from such sheet stock. As shown in Fig. 1, the housing is provided with a pair of eye apertures 16, 18 which are formed in a forwardly extending portion 20 of such size and shape as to receive and position the second element of the assembly, a light-polarizing lens or filter 30. The front housing 14 is also provided around its periphery with a rearwardly extending flange 22 of such depth as to receive and protect all of the elements of the lens and lens mounting assembly and make contact with the rear housing of the assembly. The front housing is also provided adjacent each of its outer edges with a slot 24, 26, which slots are adapted to receive a head-engaging strap employed to position the device upon the wearer's head. The front housing is also provided with a nose-engaging recess 28, as are the other elements of the lens and lens mounting assembly. The front housing is also provided with an aperture 32 adapted to receive and position a shaft extending forwardly from the rotatable elements of the device, as hereinafter described.

Adjacent the inner face of the front housing 14 and positioned within the protrusion 20 thereof is a unitary light-polarizing eye shield lens 30. This lens is preferably formed of sheet plastic material and may be made of any suitable sheet-like polarizing material commercially available.

A preferred material is a lamination comprising a thin, molecularly oriented film of polyvinyl orthoborate containing a dichroic light-polarizing stain comprising iodine and bonded to the face of a somewhat thicker supporting sheet of cellulose acetate butyrate. Such a lamination may preferably have its surfaces coated with a scratch-resistant, transparent, thin film of an alkyd-modified, thermoset, melamine-formaldehyde resin. Such a light polarizer is available in sheet form and may have an overall thickness in the neighborhood of 0.015 inch. The element 30 is preferably stamped from light-polarizing sheet material of the character described and is shaped to provide two eye lens elements 34 and 36, separated by a nose-engaging recess 38 which is enlarged as at 40 to receive a forwardly extending protrusion comprising a portion of a spacer plate employed in the lens assembly and hereinafter to be described. The recess 40 is preferably shaped to coincide exactly with the protrusion on the said spacer plate which thus effectively prevents movement of the front filter element 30 within the lens mounting assembly. In the preferred embodiment of the invention the transmission axis of the polarizing element 30 is preferably perpendicular so that when the device is worn the element 30 functions to block horizontally vibrating, specularly reflected light which is polarized.

Behind the front polarizing filter 30, and in contact therewith, there is positioned a spacer element 42 which is slightly larger in overall dimensions than the element 30, yet which is of such size and shape as to be positioned within the upstanding flange 22 of the element 14, so that as the lens mounting is assembled the filter element 30 is positioned within the protrusion 20 of the element 14, and the spacer element 42 overlies the element 30 but rests against the main front panel of the element 14, extending substantially to the upstanding flange 22.

The spacer element 42 is preferably formed of any suitable moisture-resistant fiber and may have a thickness of approximately 0.015 inch. It is provided adjacent its extreme edges with a plurality of strap-receiving slots 44, 46. It is provided also with suitable lens apertures 48, 50, and with a centrally disposed aperture 52 adapted to receive the forwardly extending protrusion on the spacer plate which has heretofore been referred to.

Behind the spacer element 42 there is positioned a spacer plate 54 which is preferably formed of sheet aluminum of somewhat heavier gauge than that employed in connection with the front housing 14. For example, the element 54 may be formed of sheet aluminum having a thickness of 0.035 inch. The element 54 is substantially of the same size and shape as is the element 42. It nests within the upstanding flange 22 of the front housing 14 and conforms substantially to the shape of the recess defined by that flange. The element 54 is also provided with strap-engaging slots 56, 58, and with suitable lens apertures. It is also provided with a forwardly extending key element or protrusion 60 of the same size and shape as the aperture 52 in element 42, and the aperture 40 in element 30. This protrusion 60 serves to fixedly position the elements 42 and 30 within the housing 14 somewhat more accurately than these elements would be held by the periphery of the housing element alone, and an aperture 62 is provided in the protrusion 60 for the reception of the forwardly extending shaft from the rotatable lens control gear about to be described. This aperture 62, which is in registry with aperture 32 of element 14, serves also as a bearing for the said shaft.

Positioned within each lens aperture of the spacer plate 54 and freely rotatable therein is a circularly shaped, light-polarizing element 64, 66. Each of these elements is notched or toothed as shown, for example, at 68 and 70, over slightly more than one-fourth of its periphery for engagement with a centrally positioned lens control gear 72 which is similarly notched or toothed for engagement with the rotatable lens element. Gear element 72 is affixed to forwardly extending shaft 74, and is positioned within protrusion 60 of element 54 which is of such size and shape as to receive gear element 72, with shaft 74 extending forwardly through apertures 62 and 32 to protrude from the face of front housing element 14. Rotatable lens elements 64, 66 and control gear 72 are preferably assembled in the manner shown in Fig. 1 so that rotation of gear 72 in a clockwise direction, for example, will cause corresponding rotation of each of lens elements 64 and 66. If these lens elements are initially positioned with their light-transmitting axes substantially parallel to the light-transmitting axis of element 30, rotation of gear 72 will cause a gradual darkening of each eye lens until elements 64, 66 have been rotated through an angle of 90° when the light transmitted by the combination of these elements and front filter element 30 is a minimum. In this position, if the polarizers selected for use in the device are substantially perfect polarizers, the lens combination will transmit substantially no light. At intermediate positions varying amounts of light will be transmitted by each eye lens assembly, depending upon the angular relation of the transmission axes of element 30 and elements 64, 66.

The light-polarizing material used for elements 64 and 66 may be the same as the material employed for element 30. In any event, these elements 64, 66 should be slightly thinner than spacer plate 54 so that they may rotate freely within the eye lens apertures of that plate without binding contact with either of the fiber spacers adjacent thereto. It should be noted that each of elements 64, 66 and 72 rotates freely within an aperture formed in spacer plate 54, i. e., the two eye lens apertures therein and that formed by the centrally disposed forward protrusion 60.

Behind spacer plate 54, with its contained rotating elements 64, 66 and 72, there is positioned a rear fiber spacer 76 which may be, in all respects, similar to spacer element 42 except that it does not have an aperture corresponding to aperture 52.

Behind spacer 76 there is a fixedly positioned, rear light-polarizing filter 78 which may be, in all respects, similar to front filter element 30 except for the centrally disposed aperture 40 therein. Preferably the transmission axis of the light-polarizing element 78 is vertical so that when the device is assembled the polarizing axes of elements 78 and 30 will be parallel.

It will be understood that the use of two fixedly positioned parallel polarizing elements, such as the elements 30 and 78, is not essential to the operation of the device. If desired, the element 78 may be replaced by an element of clear plastic material, or, under certain circumstances, it may be entirely dispensed with, although use of a closure element of plastic material of some kind is to be preferred. The use of three light-polarizing elements in sequence such as the elements 30, 64 or 66, 78, however, gives a somewhat preferred construction.

Behind the element 78 is a rear housing element 80 which is provided with a rearwardly extending protrusion of the size and shape of the element 78 and which is adapted to contain that element and fixedly position it in the same manner in which element 30 is positioned within the forwardly extending protrusion of front housing 14. Rear housing 80 is also provided with two eye lens apertures 82, 84, and with strap-engaging slots 86, 88. In many respects it is substantially the duplicate of front housing element 14 except that it contains no aperture corresponding to aperture 32, and is provided with no flange corresponding to flange 22. Rear housing 80 differs from front housing 14 in one other respect. Around the periphery of each eye opening 82, 84 there is provided a multiplicity of rearwardly extending teeth or protrusions 90 which are adapted to be bent over the adjacent wall of the resilient face-engaging shield 12 so as to clamp that shield into firm engagement with the eye lens assembly 10 as shown clearly, for example, in Fig. 3. These protrusions or teeth 90 may be stamped directly from the aluminum sheet of which rear housing 80 may be made.

Each of the elements 14, 30, 42, 54, 76, 78 and 80 is provided with a plurality of apertures 92 as shown, for example, clearly in Fig. 1 through which rivets or pins 96 may be inserted when the device is assembled to hold the elements together.

When assembled, each of the front and rear fixed polarizing filters 30, 78 is seated within, and positioned by, a protrusion stamped in the housing with which the filter is associated, and each of the rotatable polarizing lenses 64, 66 and the control gear 72, which actuates these lenses, is mounted within, and positioned by, an aperture formed in the central spacer plate 54. The rotating lenses 64, 66 are kept from contact with the fixed lenses 78, 30 by means of the fiber spacer elements 42, 76 and thus friction between the polarizing elements is avoided and surface scratches kept to a minimum.

After the elements shown in Fig. 1 have been assembled a knurled turning knob 94 may be affixed to shaft 74 as shown, for example, in Fig. 2, which also illustrates the rivets or pins 96 extending through apertures 92. The face-engaging resilient rubber shield 12 may then be affixed to the assembled front lens mount in the manner described and as shown clearly in Fig. 3. Head-holding straps (not shown) may then be provided extending through the slots designed for that purpose.

It will be apparent that the lens mounting assembly shown in detail in Fig. 1 is particularly light in weight. Its overall thickness, for example, may be of the order of 0.175 inch or less. The materials comprising the assemblage are relatively inexpensive. They are available in sheet stock; they may be stamped from such stock and easily molded where molding is necessary; and they lend themselves to mass production methods and techniques. The assembly is simple; the elements drop into position without complicated fitting; the rotatable elements are protected from wear; the surfaces between the rotatable and fixed optical elements are kept from contact and protected from dust and moisture; and the entire assemblage is of extremely light weight. It will be understood, moreover, that a lens and lens mount assembly, such as has been described and such as is shown in Fig. 1, may be employed with any suitable positioning and mounting means in lieu of the face-fitting, resilient rubber shield shown in Figs. 2 and 3. The construction of the lens and lens mount assembly is wholly independent of the face-fitting shield and may be readily modified in ways familiar to those skilled in the art for use with conventional or light-blocking temples of any desired style and shape.

Since certain changes may be made in the above product without departing from the scope of the invention herein involved, it is intended that all matter contained in the above description or shown in the accompanying drawings shall be interpreted as illustrative and not in a limiting sense.

What is claimed is:

1. In a variable density goggle, a lens and lens mount assembly comprising a front housing having a forwardly extending portion inwardly spaced from the edge of said housing and having means providing right-eye and left-eye apertures, a rear housing, a unitary light-polarizing lens element having a right-eye portion and a left-eye portion positioned between said housings and within said forwardly extending portion, a spacer element fixedly positioned between said unitary lens and said rear housing and having means providing a right-eye aperture, a left-eye aperture and a centrally disposed gear-receiving portion, a rotatable light-polarizing element positioned in each eye aperture of said spacer element and freely rotatable with respect to said spacer element, said spacer element being thicker than said rotatable polarizing elements, each said rotatable polarizing element having peripheral, gear-engaging teeth, a gear meshing with each said rotatable light-polarizing element and positioned in said gear-receiving portion, manually operable means for rotating said gear, and means holding said housings and said spacer element in superposed engagement.

2. A device as called for in claim 1 wherein a second unitary light-polarizing lens comprising left- and right-eye portions is positioned between said spacer element and said rear housing with its transmission axis substantially parallel to the transmission axis of said first-mentioned unitary light-polarizing lens.

3. A structure as called for in claim 2 wherein a thin spacer element is positioned between each unitary light-polarizing lens and the first said spacer element whereby contact between adjacent surfaces of the relatively rotatable light-polarizing elements is prevented.

4. A structure as called for in claim 3 wherein the overall thickness of said lens and lens mount assembly is of the order of 0.175 inch.

5. A structure as called for in claim 1 wherein the rear housing is provided with a plurality of lens apertures and with means adjacent the periphery of each said aperture for affixing to the rear surface of said housing a resilient face-engaging shield.

6. A structure as called for in claim 1 wherein the spacer element is provided with a centrally disposed forwardly extending protrusion, and the unitary light-polarizing lens is provided with a recess to receive said protrusion, whereby said lens is fixedly positioned with respect to said spacer element.

7. In a variable density goggle, a lens and lens mount assembly comprising in sequence, from front to back, a housing provided with a pair of lens apertures and having a protruding lens-receiving portion, a unitary light-polarizing lens comprising left- and right-eye portions and a centrally positioned aperture, said lens being positioned within the protrusion in said housing, a thin spacer element of slightly greater size than the protrusion of said housing and having a centrally disposed aperture in registry with that in said polarizing lens, a spacer plate having a plurality of lens apertures, a centrally disposed gear-receiving portion and a forwardy protruding element extending into the central apertures of said unitary polarizing lens and said thin spacer element and fixedly positioning said lens and element with respect to said spacer plate, a rotatable light-polarizing element positioned in each lens aperture of said spacer plate, each rotatable element being toothed over a portion at least of its periphery, a gear meshing with said polarizing elements and positioned within the gear-receiving portion of said spacer plate and having a shaft extending forwardly through said housing for manual rotation, a second thin spacer element positioned against the rearward face of said spacer plate and provided with a plurality of eye apertures, a second unitary light-polarizing lens having left- and right-eye portions and having its transmission axis substantially parallel to the transmission axis of the first-mentioned unitary lens, and a rear housing provided with a plurality of eye apertures and having means positioned adjacent the periphery of each of said apertures for affixing thereto a yielding face-engaging shield, at least one of said housings being provided with flange means extending substantially to the other housing for encompassing the remaining elements of the assembly.

VAITO K. ELORANTA.

REFERENCES CITED

The following references are of record in the file of this patent:

UNITED STATES PATENTS

| Number | Name | Date |
|---|---|---|
| 1,727,455 | Tully | Sept. 10, 1929 |
| 2,337,617 | Miller | Dec. 28, 1943 |
| 2,380,481 | Tillyer et al. | July 31, 1945 |
| 2,422,287 | Bernheim et al. | June 17, 1947 |